United States Patent [19]
Biggs

[11] Patent Number: 6,128,716
[45] Date of Patent: Oct. 3, 2000

[54] MEMORY CONTROLLER WITH CONTINUOUS PAGE MODE AND METHOD THEREFOR

[75] Inventor: Terry Biggs, Austin, Tex.

[73] Assignee: Motorola Inc., Schaumburg, Ill.

[21] Appl. No.: 09/010,976

[22] Filed: Jan. 23, 1998

[51] Int. Cl.$^7$ .................................................. G06F 12/06
[52] U.S. Cl. .................. 711/169; 365/203; 365/230.08; 365/230.09
[58] Field of Search .................................. 711/105, 167, 711/169; 365/230.08, 230.09, 203

[56] References Cited

U.S. PATENT DOCUMENTS

| | | | |
|---|---|---|---|
| 4,799,199 | 1/1989 | Scales, III et al. | 365/230.08 |
| 5,241,503 | 8/1993 | Cheng | 365/205 |
| 5,301,299 | 4/1994 | Pawlowski et al. | 711/5 |
| 5,479,635 | 12/1995 | Kametani | 711/105 X |
| 5,581,513 | 12/1996 | Rao | 365/238.5 |

OTHER PUBLICATIONS

"Fast Data Access of DRAMs by Utilizing a Queued Memory Command Buffer," IBM Technical Disclosure Bulletin vol. 35, No. 7, pp. 63–66 (1992).

Motorola, 1997, "MCF5206 ColdFire™ Integrated Microprocessor User's Manual", pp. 10–1—10–62.

Motorola, 1991, "Memories—Memory Device Data", pp. 2–90—2–110.

*Primary Examiner*—David L. Robertson
*Attorney, Agent, or Firm*—Paul J. Polansky

[57] ABSTRACT

A memory controller (42) supports a mode known as continuous page mode. The memory controller (42) is coupled to a pipelined internal bus and provides control signals to an external bus to control a memory such as a dynamic random access memory (DRAM) (43). The memory controller (42) compares the page portion of a next address to the page portion of the current address. If the addresses match, the memory controller (42) keeps the page open for the next cycle. However if the addresses do not match, or if the next address is not valid at this same point in time during the first access, the memory controller (42) closes the page during the first cycle. The memory controller (42) performs continuous page mode without incurring a penalty when the page is closed.

10 Claims, 2 Drawing Sheets

MEMORY CONTROLLER WITH CONTINUOUS PAGE MODE AND METHOD THEREFOR

CROSS REFERENCE TO RELATED, COPENDING APPLICATION

Related subject matter is contained in my copending patent application Ser. No. 08/929,128, entitled "Method and Apparatus to Generate Commands to a Memory," filed Sep. 3, 1997 and assigned to the assignee hereof.

FIELD OF THE INVENTION

This invention relates in general to memory systems, and more specifically to memory controllers.

BACKGROUND OF THE INVENTION

Memory devices have traditionally been accessed by a relatively standard set of control signals that are used by all manufacturers. For example, dynamic random access memories (DRAMs) have traditionally been accessed by a row address strobe (RAS) signal, a column address strobe (CAS) signal, and a write enable (WE) signal. These signals were used to control the timing of the internal circuitry on the memory, and the memory generally performed asynchronously with respect to any other system clock signals. Recently, synchronous DRAMs have also become popular.

Generally, a memory controller initiates a DRAM access by providing a row address to the DRAM and activating RAS. After the DRAM has latched the row address, the memory controller provides a column address to the DRAM and activates CAS. Once the DRAM latches the column address, it either provides the data to a data bus or latches data present on the data bus as appropriate. To conclude the cycle, the memory controller deactivates both RAS and CAS. In response to the deactivation of RAS, the DRAM precharges all the rows in preparation for a subsequent access to another row.

There are two important variations to basic DRAM timing known in the prior art. The first variation is known as burst page mode. During a burst page mode access, the memory controller begins the access by providing the first address of a group of related accesses to the DRAM. For example, the addresses can be consecutive addresses after the first address, or can be ordered in a predefined manner. For example, the addresses may be clustered modulo m around the first address, as disclosed by U.S. Pat. No. 4,799,199. The DRAM begins the burst access by activating a word line corresponding to the selected row. Since multiple columns of data are located along the selected row, subsequent accesses in the burst proceed without the row being deselected. Thus the memory controller keeps RAS active during the burst cycle and only deactivates CAS to select different column. DRAMs are able to perform burst page mode accesses faster than a corresponding number of non-burst accesses because it eliminates unnecessary repetitive decoding of the same row address. However, burst page mode does not allow two or more accesses to the same row which are not in the predetermined order.

Another variation is known as full page mode. In full page mode systems, a subsequent address is compared to a prior address to determine whether the subsequent access is to the same row, also known as the page. If the subsequent address is to the same page, the memory controller does not need to perform a redundant row selection by providing the same row address to the DRAM and activating RAS. Thus the memory controller keeps RAS active and avoids the row address selection cycle for any subsequent access to the same row. However in order to do the comparison, the memory controller implementing full page mode cannot begin a precharge of the DRAM by deactivating RAS until the second address is available and the address comparison is complete. The additional precharge time required for full page accesses usually offsets the advantage of accessing addresses on the same row in an arbitrary order. Another disadvantage of full page mode is that it does not work with extended data out (EDO) memories. EDO memories keep data valid on data output pins for an extended period, after CAS has been deactivated. Since full page mode memories require the subsequent address to be valid to determine whether to deactivate RAS, the next cycle begins and may even cause contention on the data bus.

What is needed is a controller for dynamic memories which allows full page accesses, but without the precharge penalty and with a minimum of circuit area. The present invention provides such a memory controller and a related method, and its features and advantages will be further described with reference to the drawings and the accompanying description.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

According the present invention, a memory controller has a mode for accessing a memory known as continuous page mode. The memory controller is adapted for being coupled to a pipelined bus, in which an address for a second, subsequent access appears on the bus prior to the transfer of data for a first access. The memory controller saves the first address and compares it to the second address. If the page address portion of the second address matches the page address portion of the first address, the memory controller keeps the page open without initiating a precharge between the first and second cycles. If the page address portion of the second address does not match the page address portion of the first address, or the second address has not yet been provided, the memory controller closes the page by initiating a precharge, during the first cycle, to avoid the precharge penalty associated with conventional full page mode.

Figure 1:
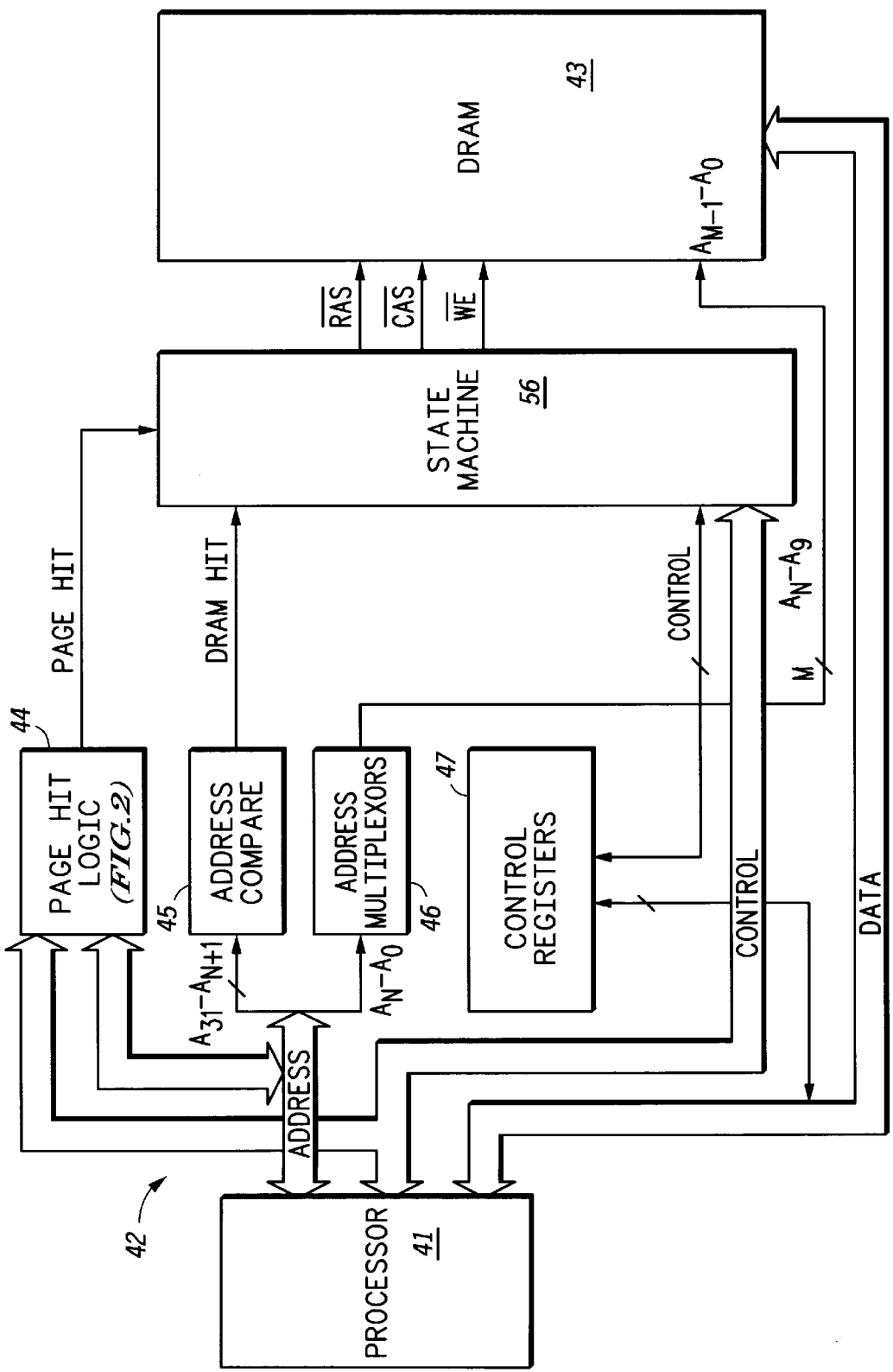
FIG. 1 illustrates in block diagram form a data processing system with a memory controller according to the present invention.

These and other features will be understood with reference to FIG. 1, which illustrates in block diagram form a data processing system 40 with a memory controller 42 according to the present invention. Data processing system 40 includes generally a processor 41, a memory controller 42, and a dynamic random access memory (DRAM) 43. While disclosed in the context of a DRAM, it should be appreciated that the present invention is equally applicable to a synchronous DRAM (SDRAM). Processor 41 has a bi-directional control terminal for conducting control signals labeled "CONTROL" via a corresponding internal bus, an address output terminal for conducting signals labelled "ADDRESS" via a corresponding internal bus, and a bi-directional data terminal for conducting signals labeled "DATA".

Memory controller 42 includes page hit logic 44, an address comparator or address compare circuit 45, address multiplexors 46, control registers 47, and a control portion or state machine 56. Page hit logic 44 includes a first input terminal coupled to the ADDRESS bus, a second input terminal coupled to the CONTROL bus, and an output terminal for providing a signal labelled "PAGE HIT". Address compare circuit 45 has an input terminal for receiving a portion of the ADDRESS, and an output terminal for providing a signal labeled "DRAM HIT". In the illustrated embodiment, processor 41 outputs a 32-bit address $A_{31}$–$A_0$, and address compare circuit 45 receives a portion of these address signals labeled "$A_{31}$–$A_{N+1}$". Address compare circuit 45 has an input terminal for receiving address signals $A_{31}$–$A_{N+1}$, and an output terminal for providing a signal labeled "DRAM HIT". Address multiplexors 46 have an input terminal for receiving address signals $A_N$–$A_0$, a control input terminal, and an output terminal for providing M address signals. DRAM 43 is mapped not into the lower address bits, but instead onto M upper address bits. Control registers 47 have a bi-directional control terminal, and a bi-directional terminal connected to the DATA bus. State machine 56 has a bi-directional control terminal connected to the control terminal of processor 41 for conducting the CONTROL signals, a bi-directional control terminal connected to the control terminal of control registers 47, an input terminal for receiving the DRAM HIT signal, and output terminals for providing the RAS, CAS, and WE control signals in active logic low form. DRAM 43 has control input terminals for receiving the RAS, CAS, and WE signals in active logic low form, and a bi-directional data terminal connected to the data terminal of processor 41.

In general operation, DRAM 43 is mapped into M higher-order address bits labeled "$A_N$ . . . $A_9$". Note that the M address bits need not be consecutive. Since DRAM 43 requires the row address to be provided to the address bus first, memory controller 42 is able to provide this address directly to the bus without performing a multiplexing function. The multiplexing function could not otherwise be started until the address compare circuit 45 outputs the DRAM HIT signal, which would extend a current memory cycle.

According to the present invention, memory controller 42 is able to perform full page accesses without the precharge penalty associated with it in a new mode known as continuous page mode. Processor 41 is a pipelined processor which is capable of pipelining consecutive memory accesses by providing an address for a next access before the data for a prior access has been transferred. Page hit logic 44 has an input for receiving that portion of the ADDRESS that addresses a page in DRAM 43. This portion will be less than all address bits by taking into account the number of bytes located in a page in DRAM 43. Page hit logic 44 also has an input for receiving some of the CONTROL signals provided by processor 41. These control signals include at least one control signal indicating that a transfer has started, and another control signal indicating that a next address which follows a first address is valid. Page hit logic 44 activates the PAGE HIT signal in response to a next address of a pair of pipelined addresses which is to the same page.

State machine 56 uses the PAGE HIT signal and other CONTROL signals to determine whether the next pipelined access is to the same page, and makes an early decision whether to precharge DRAM 43 in anticipation of another row address cycle. State machine 56 samples the PAGE HIT signal at the time during a first memory access at which a pipelined address for a next cycle would be valid. If PAGE HIT is active at this time and the next address is valid, state machine 56 keeps RAS active. If PAGE HIT is inactive at this time or the next address is not valid, state machine 56 immediately (after a propagation delay) deactivates RAS. This immediate deactivation in response to a pipelined address allows the precharge to start early and avoids the precharge penalty of the full page mode.

Figure 2:
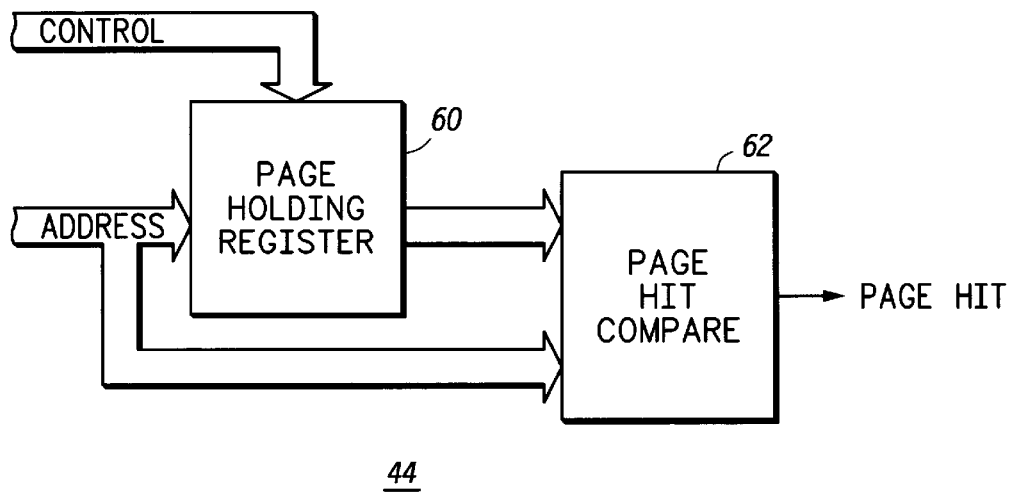
FIG. 2 illustrates in block diagram form the page hit logic of FIG. 1.

In addition, memory controller 42 implements continuous page mode with a minimum of circuitry. This advantage will become more apparent with respect to FIG. 2, which illustrates in block diagram form page hit logic 44 of FIG. 1. Page hit logic 44 includes a page holding register 60 and a page hit compare block 62. Page holding register 60 includes a first input connected to the ADDRESS bus and receives that portion of the ADDRESS which encodes the page of DRAM 43. Page holding register includes a second input connected to the CONTROL bus for receiving a portion of the CONTROL signals necessary to latch the page portion of the ADDRESS at the appropriate time. Preferably, these CONTROL signals include a signal which indicates the start of a transfer. Page holding register 60 also has an output for providing the latched portion of the ADDRESS.

Page hit compare 62 has a first input connected to the output of page holding register 60, a second input connected to the page portion of the ADDRESS bus, and an output for providing the PAGE HIT signal. Page hit compare 62 activates the PAGE HIT signal when the value stored in page holding register 60 matches the page portion of the ADDRESS. Note that Page hit compare 62 may also include a control input which determines when it performs the comparison, in order to avoid consuming power during periods of time in which the comparison is not meaningful.

Note that page hit logic 44 only requires a single page holding register and compare circuitry regardless of the number of banks DRAM 43 is divided into. Thus memory controller 42 implements continuous page mode with only a minimal amount of extra circuitry.

Figure 3:
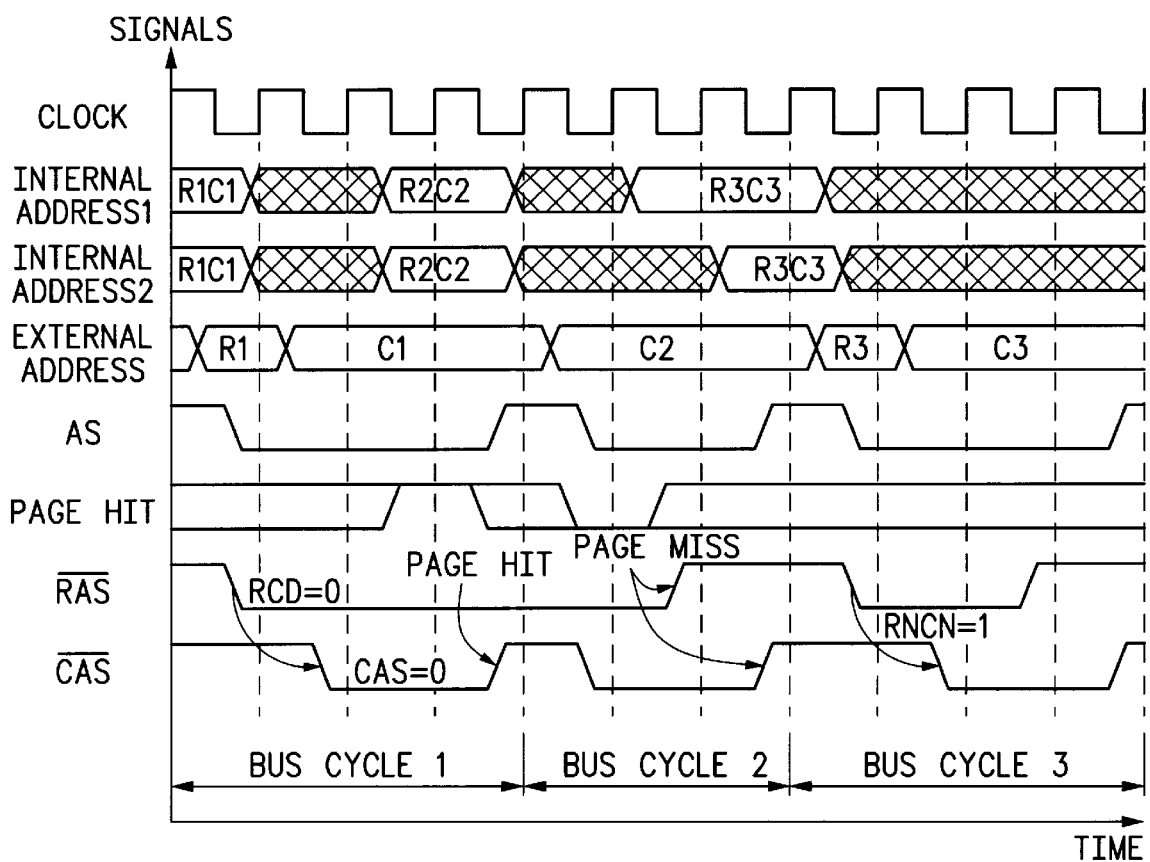
FIG. 3 illustrates a timing diagram useful in understanding the operation of the memory controller of FIG. 1.

FIG. 3 illustrates a timing diagram useful in understanding the operation of the memory controller of FIG. 1. Note that while the present invention is applicable to both synchronous and asynchronous DRAMs, it is illustrated in the context of an asynchronous DRAM. However FIG. 3 illustrates a master clock signal (CLOCK) which may be used to control memory controller 42 and is useful for reference. Also FIG. 3 illustrates two cases in which memory controller 42 is able to deactivate RAS early. The first case is illustrated by a signal labelled "INTERNAL ADDRESS 1". During a first bus cycle labelled "BUS CYCLE 1", INERNAL ADDRESS 1 has a value labelled R1C1, in which R1 represents the row address portion and C1 represents the column address portion. Memory controller 42 performs BUS CYCLE 1 by providing address R1 as the external address and activating RAS. Subsequently, INTERNAL ADDRESS 1 conducts a second address for a second access which is pipelined with the first access. This value is illustrated as address R2C2. In this case, R2=R1, and therefor page hit logic 44 activates the PAGE HIT signal. Signal AS (address strobe) indicates the start of external bus cycles. In response to the activation of the PAGE HIT signal, state machine 56 keeps RAS active but deactivates CAS after the transfer of the first data element at address R1C1.

A subsequent value for INTERNAL ADDRESS 1 occurs during the second bus cycle and is designated R3C3. In this case, R3≠R2, and page hit logic 44 becomes inactive during BUS CYCLE 2. When state machine samples PAGE HIT during BUS CYCLE 2 and finds it to be inactive, it terminates the page mode access by deactivating both RAS and CAS. However, according to the present invention, state machine 56 deactivates RAS early, at about the middle of bus cycle 2. This early deactivation of RAS allows the rows of DRAM 43 to begin precharging early, and the next bus cycle (BUS CYCLE 3) to take place without a delay. It also allows extended data out (EDO) operation without contention.

Alternatively, the sequence of addresses designated "INTERNAL ADDRESS 2" may be conducted on the ADDRESS BUS. The difference between INTERNAL ADDRESS 2 and INTERNAL ADDRESS 1 is that the address for BUS CYCLE 3 is not valid on the bus at the time state machine 56 samples PAGE HIT. Memory controller 42 assumes that the next cycto the sa to the same page, and begins the RAS precharge cycle early in the same manner as for INTERNAL ADDRESS 1.

Although the present invention has been described with reference to a specific embodiment, further modifications and improvements will occur to those skilled in the art. For example, the disclosed memory controller may is useful for both asynchronous and synchronous DRAMs. Further other types of memories besides those based on capacitive storage may be used. Therefore it is to be understood that the invention encompasses all such modifications that do not depart from the scope of the invention as defined in the appended claims.

I claim:

1. A memory controller with continuous page mode, comprising:

an address input terminal adapted to be coupled to an address portion of a pipelined bus;

a register having an input terminal coupled to said address input terminal, a control input terminal for receiving a first control signal which when active indicates a start of a transfer, and an output terminal, wherein said register stores a value at said input terminal in response to an activation of said first control signal;

a comparator having a first input terminal coupled to said output terminal of said register, a second input terminal coupled to said address portion of said pipelined bus, and an output terminal for providing a page hit signal; and a state machine having a first input terminal for receiving said page hit signal, a second input terminal for receiving a second control signal which when active indicates that a next address is valid on said address portion of said pipelined bus prior to a completion of a first access, and an output terminal coupled to a control portion of an external bus, said state machine controlling said first access on said external bus by activating at least one external control signal, and subsequently initiating a precharge on said external bus by deactivating said at least one external control signal during said first access, either in response to a deactivation of said second control signal during said first access or to a deactivation of said page hit signal when said second control signal is active.

2. The memory controller of claim 1 wherein said at least one external control signal comprises a row address strobe signal.

3. The memory controller of claim 1 wherein said at least one external control signal further comprises a column address strobe signal.

4. A method for accessing a memory comprising the steps of:

receiving a first address of a first internal access from a pipelined internal bus;

controlling a first external access corresponding to said first internal access on an external bus by activating at least one external control signal; and if a second address of a second internal access is received from said pipelined internal bus before a completion of said first external access, performing the steps of:

comparing said second address to said first address; and initiating a precharge of the memory by deactivating said at least one external control signal during said first external access if said second address is not equal to said first address.

5. The method of claim 4 further comprising the step of initiating said precharge of the memory during said first external access if said second address of said second internal access is not received from said pipelined internal bus before said completion of said first internal access.

6. The method of claim 4 wherein said step of controlling comprises the step of:

activating a row address strobe signal.

7. The method of claim 6 wherein said step of controlling further comprises the step of:

activating a column address strobe signal after activating said row address strobe signal.

8. A method for accessing a memory comprising the steps of:

receiving a first address of a first internal access from a pipelined internal bus;

controlling a first external access corresponding to said first internal access to the memory on an external bus by activating at least one external control signal;

receiving a second address of a second internal access from said pipelined internal bus selectively before a completion of said first internal access; and if said second address has not been received from said pipelined internal bus before said completion of said first internal access, initiating a precharge of the memory by deactivating said at least one external control signal during said first external access.

9. The method of claim 8 wherein said step of controlling comprises the step of:

activating a row address strobe signal.

10. The method of claim 9 wherein said step of controlling further comprises the step of:

activating a column address strobe signal after activating said row address strobe signal.

* * * * *